(12) United States Patent
Nakano

(10) Patent No.: US 8,204,643 B2
(45) Date of Patent: Jun. 19, 2012

(54) ESTIMATION DEVICE, ESTIMATION METHOD AND ESTIMATION PROGRAM FOR POSITION OF MOBILE UNIT

(75) Inventor: Tsuyoshi Nakano, Kyoto (JP)

(73) Assignee: Murata Kikai Kabushiki Kaisha, Kyoto-shi, Kyoto (JP)

( * ) Notice: Subject to any disclaimer, the term of this patent is extended or adjusted under 35 U.S.C. 154(b) by 551 days.

(21) Appl. No.: 12/295,088

(22) PCT Filed: Feb. 28, 2007

(86) PCT No.: PCT/JP2007/053746
§ 371 (c)(1),
(2), (4) Date: Sep. 29, 2008

(87) PCT Pub. No.: WO2007/113956
PCT Pub. Date: Oct. 11, 2007

(65) Prior Publication Data
US 2009/0248305 A1    Oct. 1, 2009

(30) Foreign Application Priority Data
Mar. 31, 2006   (JP) ................................. 2006-097422

(51) Int. Cl.
*G01C 22/00* (2006.01)
*G05D 1/00* (2006.01)
(52) U.S. Cl. ............ 701/28; 701/23; 701/408; 701/409; 701/445; 701/464; 701/448; 701/469; 701/472; 701/500; 701/523; 340/995.24; 340/995.25; 340/995.28; 382/106; 382/153; 700/245; 700/253; 700/259; 348/119

(58) Field of Classification Search .................. 701/207, 701/208, 217, 300, 23, 28, 408, 409, 445, 701/446, 448, 461, 469, 472, 494, 495, 500, 701/501, 519, 520, 523, 532, 534; 340/990, 340/995.1–995.28; 382/104, 106, 153; 348/113–120; 700/245, 253, 259
See application file for complete search history.

(56) References Cited

U.S. PATENT DOCUMENTS

| | | | |
|---|---|---|---|
| 4,933,864 A | * | 6/1990 | Evans et al. ............... 701/207 |
| 4,940,925 A | * | 7/1990 | Wand et al. ............... 318/587 |

(Continued)

FOREIGN PATENT DOCUMENTS

JP    8-247775 A    9/1996

(Continued)

OTHER PUBLICATIONS

T. Adachi et al.; "Self-Location Estimation of a Moving Camera Using Edge Information of Known Environment"; IEICE Technical Report, vol. 105, No. 295, pp. 31-36; Sep. 10, 2005.

(Continued)

*Primary Examiner* — Hussein Elchanti
*Assistant Examiner* — Rami Khatib
(74) *Attorney, Agent, or Firm* — Westerman, Hattori, Daniels & Adrian, LLP

(57) ABSTRACT

Enabled is to estimate a self-position even when no landmark is seen or when an article confusing the landmark is brought in. An omnidirectional camera recognizes a vertical landmark near a wall to determine a candidate for the self-position. On the basis of the candidate determined, a break in a map between a floor and a wall is projected on the camera image thereby to perform the matching.

3 Claims, 5 Drawing Sheets

U.S. PATENT DOCUMENTS

| | | | |
|---|---|---|---|
| 5,051,906 A * | 9/1991 | Evans et al. | 701/28 |
| 5,525,883 A * | 6/1996 | Avitzour | 318/587 |
| 6,025,790 A * | 2/2000 | Saneyoshi | 340/946 |
| 6,825,485 B1 * | 11/2004 | Mehlberg | 250/559.29 |
| 7,137,162 B2 * | 11/2006 | Spencer et al. | 14/71.5 |
| 7,191,056 B2 * | 3/2007 | Costello et al. | 701/200 |
| 7,305,149 B2 * | 12/2007 | Yoshikawa et al. | 382/305 |
| 2004/0062419 A1 * | 4/2004 | Roh et al. | 382/104 |
| 2006/0074532 A1 * | 4/2006 | Hong | 701/28 |

FOREIGN PATENT DOCUMENTS

| | | | |
|---|---|---|---|
| JP | 9-53939 A | 2/1997 | |
| JP | 2004-034272 A | 2/2004 | |
| JP | 2005-325746 A | 11/2005 | |

OTHER PUBLICATIONS

Ryo Kurazume et al.; "Robust Positioning Method using Omni-directional Camera and Dead Reckoning for Soccer Robots"; Journal of the Robotics Society of Japan, vol. 22, No. 3, pp. 343-353, 2004.

International Search Report of PCT/JP2007/053746, date of mailing May 1, 2007.

* cited by examiner

F I G. 2
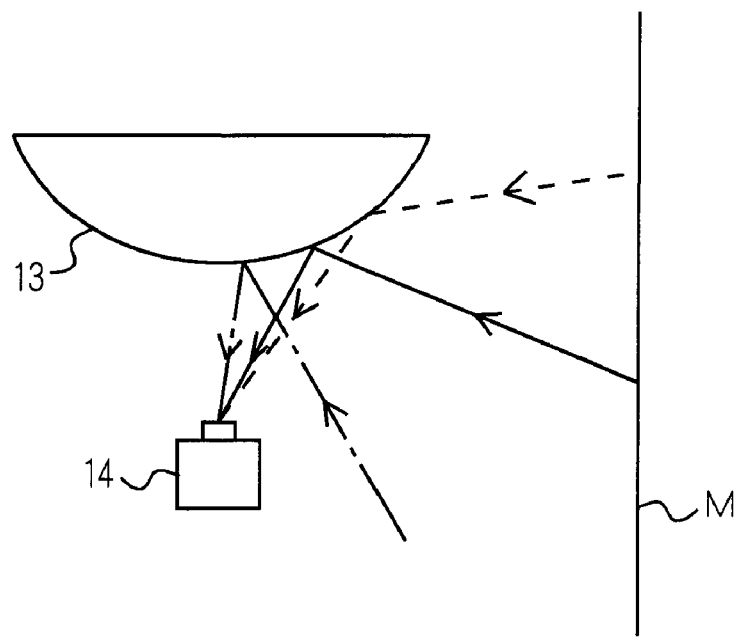
F I G. 3
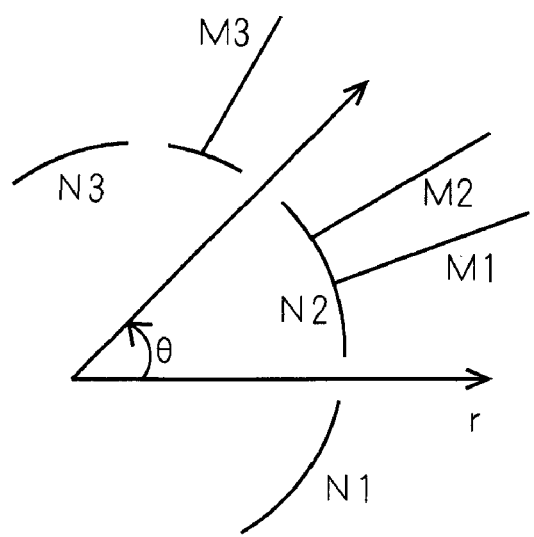

ESTIMATION DEVICE, ESTIMATION METHOD AND ESTIMATION PROGRAM FOR POSITION OF MOBILE UNIT

FIELD OF THE INVENTION

This invention relates to a device for estimating a position of a mobile unit such as a robot, an estimation method and an estimation program.

BACKGROUND ART

In control of a mobile unit such as a robot, it is important to accurately estimate a self-position. It has been known that an omnidirectional camera, a fisheye lens camera or the like is mounted on the mobile unit as a visual sensor, and a map of a landmark to be seen by the camera is stored, and that the self-position is estimated using an image from the camera with reference to the map. For example, in Non-Patent Document 1, three candidates for the landmarks are randomly extracted from the camera image, and three landmarks are randomly extracted from the map to associate these on a one-on-one basis, thereby setting a candidate for a self-position. Next, assuming that this candidate position is correct, an angle of visibility from the estimated self-position with respect to another landmark of the map is found to find an error between itself and an angle of visibility with respect to a candidate for the another landmark in the camera image. The association between the candidate for the landmark and the map in which the above-described error is minimum is determined to be correct, and a self-position based on this is outputted. For evaluation of the error, for example, an error in angle of visibility between the candidate for the landmark in the camera image and the landmark on the map is squared to use a median value thereof. Not only the median value but also an integrated value of the error or the like may be used.

However, in an artificial circumstance, such as inside a building, bringing in another article may hinder the landmark on the map from being seen, bringing in an article confusing the landmark or lighting may make the landmark less visible, and so on, after creating the map. By these, the landmark on the map may disappear, or other than the candidate for the landmark, in other words, a false landmark may be extracted. The disappearance of the landmark or the false landmark drastically makes the estimation of the self-position complicated. Consequently, a mark that can be surely recognized from the camera image and does not confuse another article needs to be searched. In this respect, Patent Document 1 (Japanese Laid-Open Patent Publication No. 2004-34272) proposes that a fluorescent lamp on a ceiling is set as a landmark. However, when in a large room, there are a number of fluorescent lamps, all the fluorescent lamps have the same shape and are arranged regularly, and thus, it is not easy to recognize which of the fluorescent lamps is seen in the camera image.

Non-Patent Document 1: Robust Self-Position Identification Method of Soccer Robot Having Omnidirectional Camera and Dead Reckoning Function, Journal of the Robotics Society of Japan Vol. 22, No. 3, pp. 343-352, 2004, 4.
Patent Document 1: Japanese Laid-Open Patent Publication No. 2004-34272

DISCLOSURE OF THE INVENTION

A problem of this invention is to enable a position of a mobile unit to be accurately estimated even when a portion of a landmark is hidden or an article confusing the landmark occurs after a map is created.

An additional problem of this invention is to enable the position of the mobile unit to be estimated even when there is a portion that cannot be seen on a wide-angle camera image in a break between a floor and a wall side.

MEANS FOR SOLVING THE PROBLEMS

An estimation device for a position of a mobile unit of this invention is a device that includes a wide-angle camera and a map of a landmark, and checks a landmark found from a wide-angle camera image against a landmark on the map to estimate a self-position of the mobile unit, and is characterized in that a break between a floor and an object that is perpendicular to the floor is stored in the map, and in order to evaluate validity of the estimated self-position, matching means for evaluating an error between a break obtained by projecting the break stored in the map onto the wide-angle camera image based on the estimated self-position, and a break in the wide-angle camera image is provided.

An estimation method for a position of a mobile unit of this invention is a method in which a wide-angle camera and a map of a landmark are used, and a landmark found from a wide-angle camera image is checked against a landmark on the map to estimate a self-position of the mobile unit, and is characterized in that a break between a floor and an object that is perpendicular to the floor is stored in the map, and in order to evaluate validity of the estimated self-position, by evaluating an error between a break obtained by projecting the break stored in the map onto the wide-angle camera image based on the estimated self-position, and a break in the wide-angle camera image, the validity of the estimated self-position is estimated.

An estimation program for a position of a mobile unit of this invention is a program for estimating a self-position of the mobile unit by referring to an image from a wide-angle camera and a map of a landmark and checking a landmark found from the wide-angle camera image against the landmark on the map, and is characterized by being provided with an order to extract the landmark from the wide-angle camera image and check the same against the landmark on the map to thereby estimate the self-position of the mobile unit, an order to read out a break between a floor and an object that is perpendicular to the floor, which is stored in the map, and a matching order to evaluate an error between a break obtained by projecting the break stored in the map onto the wide-angle camera image based on the estimated self-position, and a break in the wide-angle camera image in order to evaluate validity of the estimated self-position.

Preferably, in the above-described matching, when the break in the wide-angle camera image corresponding to the break obtained by projecting is absent, an error between a break obtained by projecting onto the wide-angle camera image the break stored in the map based on a self-position found in an internal sensor of the mobile unit and the break projected based on the estimated self-position is evaluated.

In this specification, description of estimation of a position of a mobile unit is applied to any of the estimation device, the estimation method and the estimation program, and particularly, description of the estimation device is applied to the estimation method and the estimation program, and description of the estimation method is applied to the estimation device and the estimation program.

EFFECTS OF THE INVENTION

In this invention, a landmark extracted from a wide-angle camera image is checked against a landmark on the map to estimate a self-position. Here, at least three landmarks are taken from the wide-angle camera image and the map to be associated on a one-on-one basis, and a candidate for the self-position is found. The estimated self-position depends on the combination of the landmarks taken from the map and the wide-angle camera image and a correspondence relation of the landmarks, and when they vary, another self-position is estimated. Consequently, when the number of the landmarks is large, a great number of candidates for the self-position occur. The landmark is, for example, a pattern perpendicular to a floor surface, which includes an edge of a wall or an object, such as furniture, a locker, a window and a door arranged along the wall. However, if another object is brought in after the map is created, the landmark may be hidden, or a landmark absent in the map may occur. The presence of a number of landmarks, and the situation where some of the landmarks are not seen or a false landmark occurs drastically increase a calculation amount to estimate a correct self-position, and increase a possibility of outputting an incorrect self-position.

A border between a floor and a wall or the like produces a break in the wide-angle camera image. A landmark perpendicular to the floor is, for example, a line segment in a radial direction in the wide-angle camera image, while the break is a curve or a line segment in a circumferential direction. Even in a portion other than the border between the floor and the wall, if an object that is perpendicular to the floor is placed, a break occurs, and thus, there exist a number of breaks, and in addition, a break absent in the map can exist. Consequently, to find, on the map, a break corresponding to a break on the wide-angle camera image has its own limits. However, in the case where a self-position is estimated, based on the estimated self-position, how the break on the map ought to be seen on the wide-angle camera image can be found. When this is referred to as "the break on the map is projected onto the wide-angle camera image", the projected break and the break in the wide-angle camera image are matched to evaluate an error therebetween, by which validity of the estimation of the self-position can be verified. If the validity of the estimation of the self-position can be verified, a calculation amount to estimate the correct self-position can be reduced and misestimation due to an invisible landmark and a false landmark can be reduced.

The verification of the validity of the self-position estimation is easy even when there are a number of landmarks, and also, even when a portion of the landmark becomes invisible, an object confusing the landmark is brought in, it can be executed. Moreover, even when something the position of which is difficult to describe on the map, such as a human being or another mobile unit, occurs around the mobile unit, the self-position can be estimated.

Lighting, an object brought in around the wall or the like may make the break between the floor and the wall side invisible in the wide-angle camera image. Generally, the mobile unit estimates a self-position by an internal sensor provided in a traveling wheel or a leg, a rotary shaft of a traveling motor, a steering device or the like. Although the self-position found by the internal sensor is less accurate, in a portion where the break disappears from the wide-angle camera image, so that the matching with the break projected from the map cannot be performed, a break obtained by projecting the break on the map onto the wide-angle camera image based on the self-position found by the internal sensor can be used in place of the break in the wide-angle camera image. This can prevent an error from diverging in an area where the break is hardly seen, and the validity of the estimated self-position can be evaluated, depending on the reliability of the self-position by the internal sensor.

BRIEF DESCRIPTION OF THE DRAWINGS

FIG. 2 is a diagram showing a configuration of an omnidirectional camera used in the example.
FIG. 3 is a diagram showing landmarks M1 to M3 and breaks N1 to N3 between a floor and a wall in an omnidirectional camera image.

Figure 1:
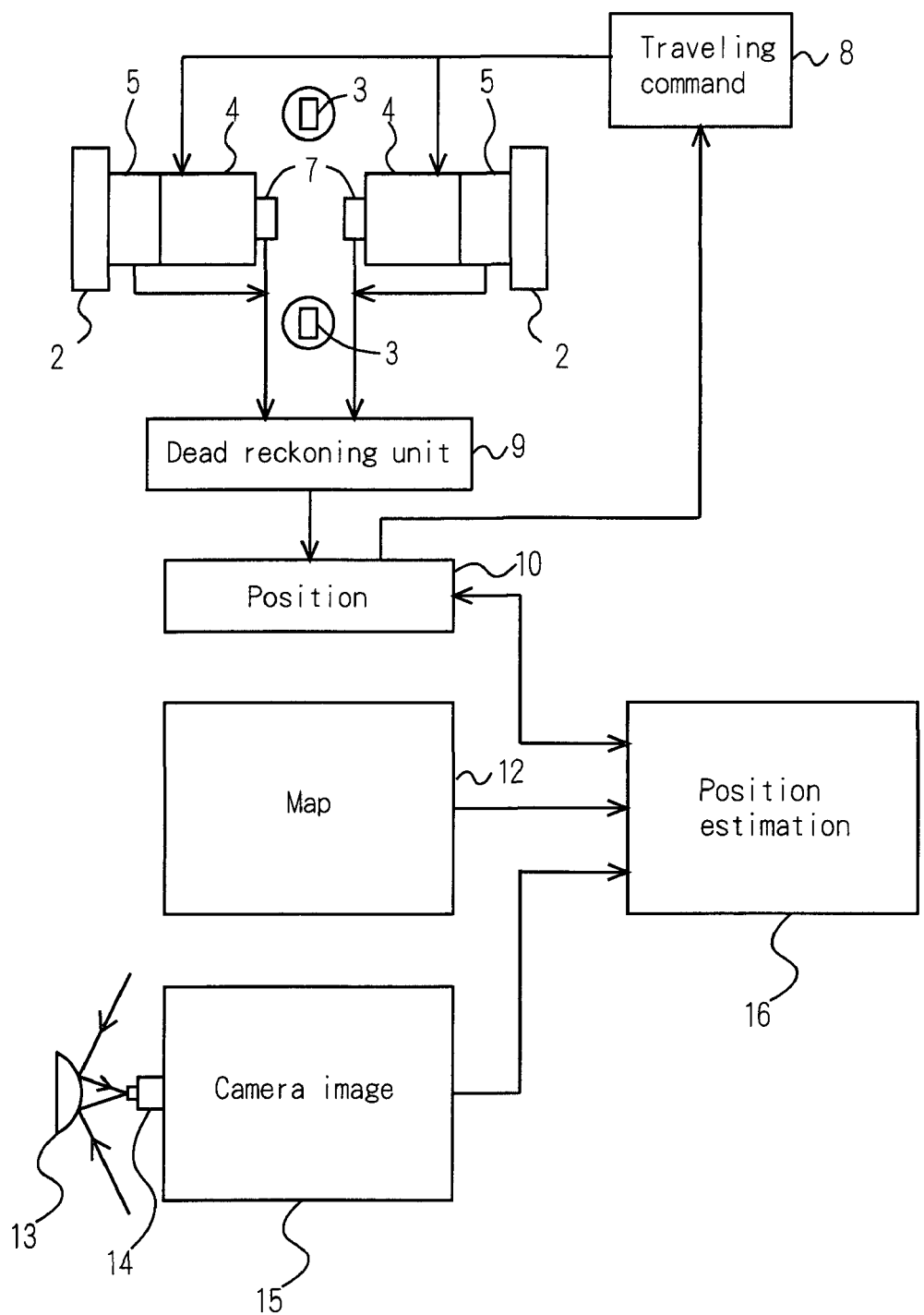
FIG. 1 is a block diagram showing a self-position recognizing unit and a traveling system of a robot of an example.

DESCRIPTION OF REFERENCE NUMERALS 2 drive wheel
3 caster wheel
4 traveling motor
5 gear head
7 encoder
8 traveling command generator
9 dead reckoning unit
10 position storage
12 map
13 mirror
14 camera
15 camera image storage
16 position estimating unit
20 landmark matching unit
22 landmark error evaluating unit
24 break projecting unit
26 break projecting unit
28 break matching unit
30 position estimating unit
60 self-position estimating program
62 landmark matching order
63 self-position candidate calculating order
64 landmark error evaluating order
65, 66 break projecting order
67 break matching order
68 self-position estimating order
70 break in a map
72 break in a camera image
74 break from dead reckoning
M landmark
N break

BEST MODE FOR CARRYING OUT THE INVENTION

A preferred example for carrying out the present invention is described below.

EXAMPLE

In FIGS. 1 to 7, an example relating to estimation of a self-position of a mobile unit is shown. FIG. 1 shows a traveling system of a robot in which an estimation device for a self-position according to the example is incorporated, and reference numerals 2, 2 denote a pair of drive wheels, each of which is rotated by a traveling motor 4 and a gear head 5, and the number of revolution of the motor 4 is monitored by an encoder 7, and inputted to a dead reckoning unit 9 described later. Moreover, a reduction rate of a gear of the gear head 5 and a type of normal rotation/reverse rotation are also inputted to the dead reckoning unit 9. Reference numerals 3, 3 denote a pair of caster wheels. A traveling command generator 8 independently controls rotation amounts and rotation directions of the drive wheels 2, 2 by independently controlling the traveling motors 4, 4 and the gear head units 5, 5 to move the robot to a target position. In the case of a walking type robot, in place of the drive wheels 2 and the caster wheels 3, legs constructed by combination of joints may be used. A type of the mobile unit may be a carrying vehicle, a transfer device or the like besides the robot, and a mechanism of movement itself is arbitrary.

The encoders 7, 7 are one example of internal sensors, signals thereof are inputted to the dead reckoning unit 9, and a moving distance is integrated to thereby find the self-position. Finding the self-position by the signals of the internal sensors is referred to as dead reckoning. The found position is stored in a position storage 10, every time a more accurate position is estimated by a position estimating unit 16, the found position is updated, and based on the data of the position storage 10, the traveling command generator 8 generates a traveling command.

A map 12 is a map having a range where the mobile unit such as the robot can be moved, and the movable range is in doors, inside a building, out of doors or the like. In the example, an edge perpendicular to a floor surface is set as a landmark, a position of the landmark and a break between a horizontal surface and a vertical surface, such as a border between a floor and a wall are stored in the map 12. The edge perpendicular to the floor surface includes, for example, edges of furniture and a locker, and vertical edges of a door and a window. While the position of the landmark is represented by a position in a horizontal plane of (X, Y), a Z direction (vertical) coordinate may be added, so that a Z-axis direction coordinate Z0 as an origin of the landmark and a Z-axis direction coordinate Z1 as a terminal of the landmark may be added. The break includes not only the break between the floor and the wall, but also the break occurs in a position where an object rises with respect to the floor surface, that is, at an end portion of the floor surface. Moreover, the break occurs at a border between a driveway and a sidewalk, at a border between a sidewalk and a flowerbed, or at a border between a sidewalk and a gully. The break on the map 12 is represented by a curve or a line segment, and only a break having a height of floor surface level may be used, or a break in a higher position, for example, an edge between an upper surface and a side surface of a step rising from the floor surface may also be used.

The creation of the map 12 is, for example, performed manually, or a wide-angle camera image captured in a known position with respect to a movement space of the mobile unit indoors, inside of a building, in the vicinity of entrance of a building or the like may be recognized to create the map 12. Reference numeral 13 denotes a mirror, and reference numeral 14 denotes a camera, and the combination of them is referred to as a wide-angle camera. An output image of the wide-angle camera is stored in a camera image storage 15, and in the position estimating unit 16, a self-position of the mobile unit is estimated using the data of the position storage 10, and the map 12, and the camera image. Data of the self-position is composed of three components of (X, Y) coordinates with respect to an origin, and an orientation of the mobile unit, for example.

FIG. 2 shows a state where a landmark M perpendicular to the floor surface is imaged by the camera 14, and if a height position in the landmark M made of a vertical line segment is different, light enters in a different position on a line segment along a radial direction from a center of a visual field of the camera 14. FIG. 3 schematically shows how three landmarks M1 to M3 and three breaks N1 to N3 appear in the wide-angle camera image. Reference numeral r represents a radial direction, and θ represents an orientation, and for the landmarks M1 to M3 perpendicular to the floor surface, line segments having constant orientations and extending in the radial direction are obtained. It is publicly known that once the landmarks M1 to M3 extending in the radial direction can be detected on the wide-angle camera image, X and Y coordinates thereof can be found. Moreover, the breaks N1 to N3 are, for example, represented by curves in a circumferential direction, the radial position of which is substantially constant.

Figure 4:
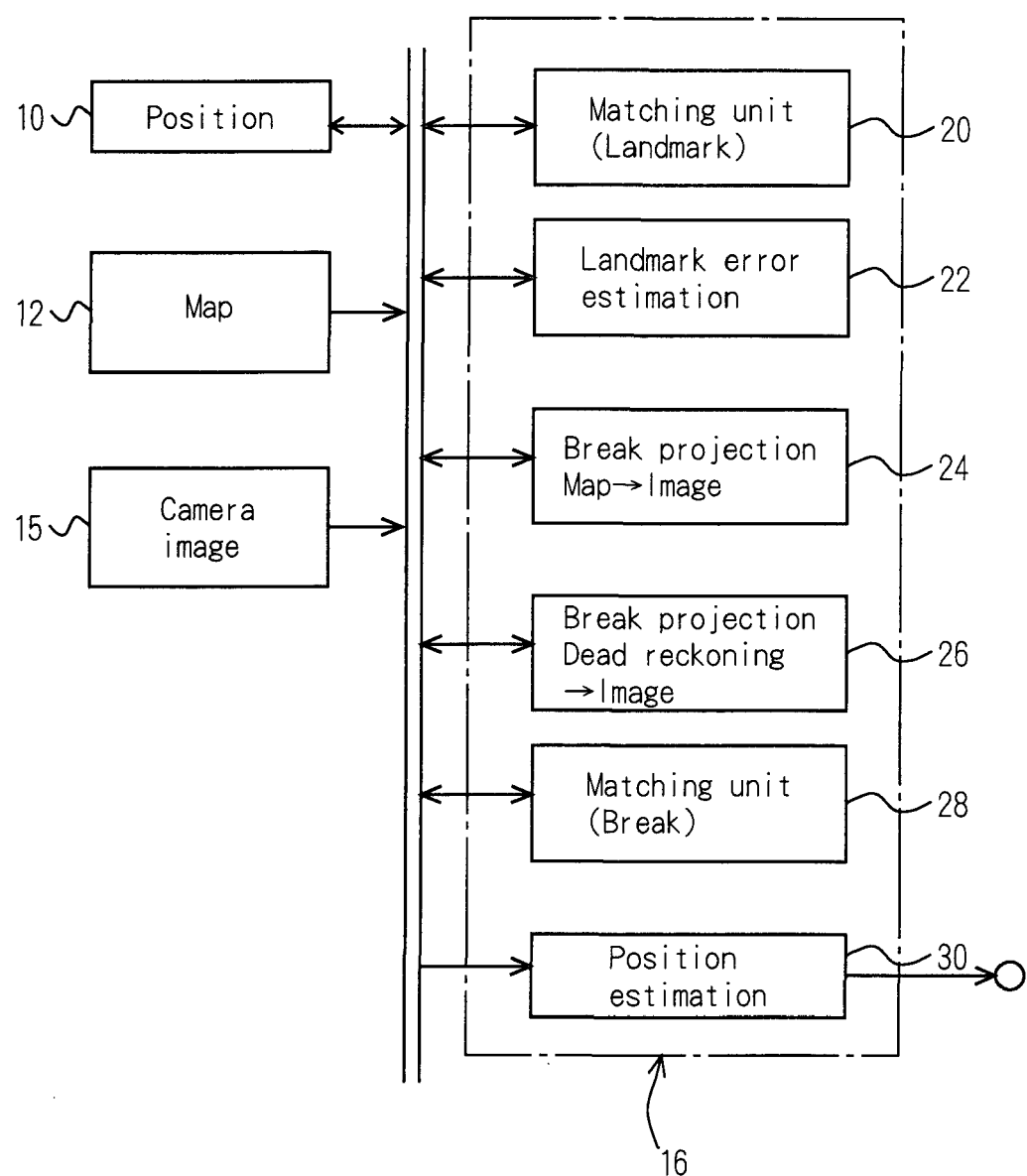
FIG. 4 is a block diagram of a position estimating unit of the example.

In FIG. 4, a structure of the position estimating unit 16 is shown. A landmark matching unit 20 associates three landmarks extracted from the camera image and three landmarks extracted from the map 12 on a one-on-one basis, and based on this correspondence, a self-position is estimated. The estimated self-position is based on the correspondence relation between the assumed landmarks. A landmark error evaluating unit 22 evaluates an error based on the estimated self-position using a landmark not used for the estimation of the self-position. Namely, when the self-position is estimated, in which orientation the other landmark on the map 12 is seen on the wide-angle camera image can be estimated, the error between the above-described orientation and that of the actual camera image can be evaluated. The landmark error evaluating unit 22 may not be provided.

A break projecting unit 24 projects, onto the wide-angle camera image, the break on the map 12 based on the self-position estimated by the matching of the landmarks. Once the self-position is estimated, how the break on the map 12 is seen in the wide-angle camera image can be estimated based on this, which is referred to as break projection. A break projecting unit 26 projects how the break on the map 12 is seen on the wide-angle camera image, based on the position stored in the position storage 10, in other words, the self-position found by the dead reckoning using the encoder 7. The break projecting unit 26 may not be provided.

A break matching unit 28 performs matching between the break projected by the break matching unit 24 and the break in the wide-angle camera image. When the break on the camera image does not exist within a predetermined distance on the wide-angle camera image from the projected break, the break projected by the projecting unit 24, and the break projected by the projecting unit 26 are matched, in other words, a distance between the two breaks is calculated. This distance includes an additional value of errors in respective portions of the break, a sum of values obtained by converting the errors in the respective portions of the break using an appropriate function and the like. A position estimating unit 30 verifies validity of an estimated value of the self position, based on a found error, and an estimated position the error of which is less than a predetermined value, or the error of which is enough small is outputted as the self-position. Otherwise, the combination of the landmark on the wide-angle camera image side and the landmark on the map side to be matched by the matching unit 20 is changed, and a series of processing up to that of the matching unit 28 is repeated.

Figure 5:
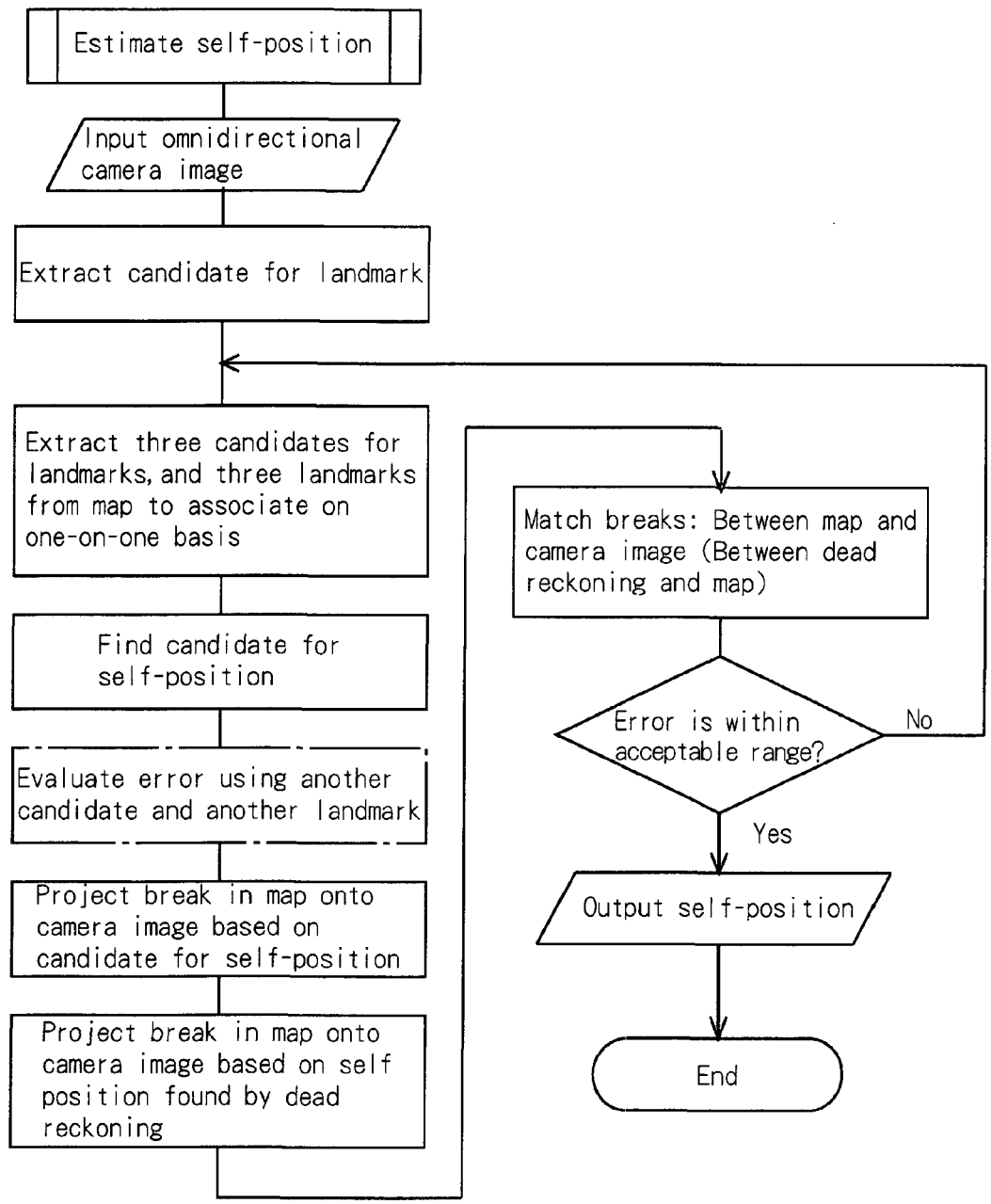
FIG. 5 is a flowchart showing an algorism of a self-position estimating method of the example.

In FIG. 5, an estimation algorism of the self-position is shown. An omnidirectional camera image is inputted, and for example, three candidates for landmarks are extracted from the camera image. The extraction may be randomly performed, or based on the data of the position storage unit 10, landmarks that should be seen from a current self-position may be extracted. Similarly, three candidates for landmarks are extracted from the map, and are associated on a one-on-one basis. This association may be randomly performed, or feasible association on the data of the position storage 10 may be given priority. When the three landmarks are associated between the wide-angle camera image and the map, one candidate for the self-position is found. An estimation error of the self-position is evaluated, for example, using another candidate and another landmark. This step may be omitted.

Next, based on the found candidate for the self-position, a break on the map is projected onto the wide-angle camera image. While the landmark perpendicular to the floor surface provides data of one point on the floor surface, the break provides data of a straight line or a curve on the floor surface, which makes an information amount abundant. Accordingly, the matching of the breaks allows the error to be evaluated more accurately. Next, based on the self-position found by dead reckoning, the break on the map is projected onto the wide-angle camera image. This processing may be omitted, and if ever, it may be executed only for an area where the break projected based on the estimated value of the self-position, and the wide-angle camera image do not correspond to each other.

Next, an error between the break obtained by projecting the break on the map based on the estimated self-position and the break in the wide-angle camera image is evaluated. In an area where the break corresponding to the break projected based on the estimated value of the self-position is absent in the wide-angle camera image, the break obtained by projecting the break on the map based on the position found by dead reckoning, and the break obtained by projecting the break on the map in accordance with the self-position estimated by the landmark are compared. The error between them is found, and if the error is within an acceptable range, the estimated position is outputted as a correct self-position to update the data of the position storage 10.

Figure 6:
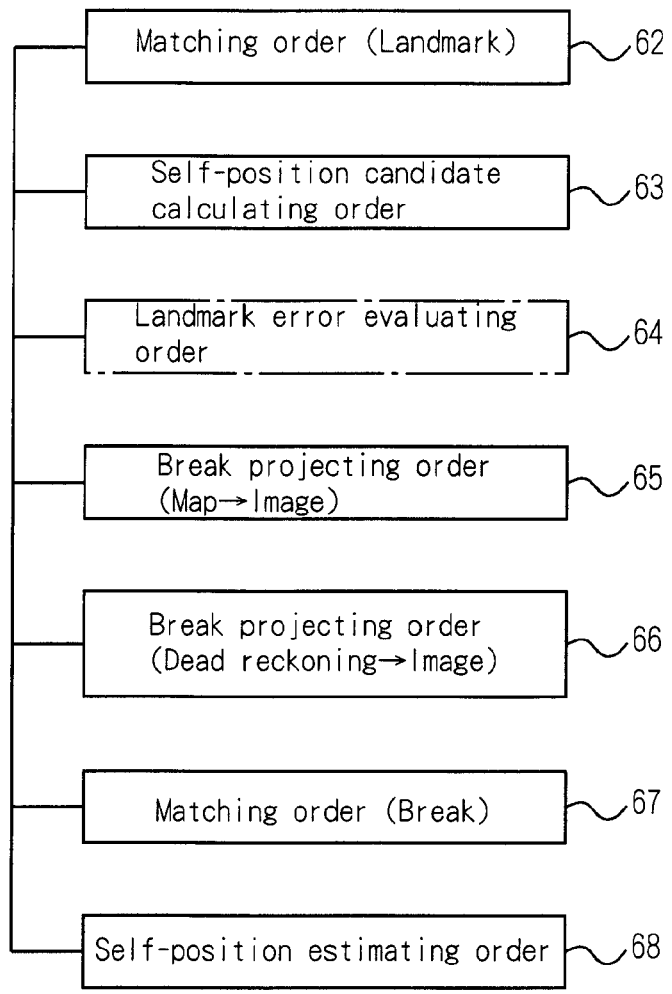
FIG. 6 is a block diagram of a self-position estimating program of the example.

In FIG. 6, a self-position estimating program 60 is shown, in which a landmark matching order 62 extracts, for example, three candidates for landmarks in the wide-angle camera image and three landmarks on the map to temporarily associate them, respectively. A self-position candidate calculating order 63 calculates a candidate for a self-position based on the above-described correspondence. A landmark error evaluating order 64 evaluates an error between another landmark on the map and another candidate for the landmark in the wide-angle camera image, based on the calculated self-position. The landmark error evaluating order 64 may not be provided.

A break projecting order 65 projects a break on the map onto the wide-angle camera image, based on the candidate for the estimated self-position. A break projecting order 66 projects the break on the map onto the wide-angle camera image, based on the position found by the dead reckoning, but the order 66 may not be provided. A break matching order 67 performs matching between the breaks to evaluate an error. A self-position estimating order 68 evaluates validity of the estimated self-position, based on the matching error of the break evaluated by the break matching order 67, and if it is valid, the position is outputted, while if it is invalid, the series of processing of the orders 62 to 67 is repeated. Generally, there are a plurality of breaks, and for example, about several breaks exist indoors. The matching is performed for each of the breaks, the error includes an additional value of errors of the respective breaks, an amount of statistics obtained by turning the errors of the respective breaks into statistics, and the like.

Figure 7:
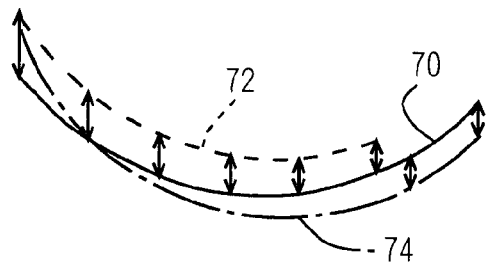
FIG. 7 is a diagram showing projection (solid line) of a break from a map, a break (broken line) in the camera image, and projection (chain line) of a break based on a dead reckoning position.

FIG. 7 shows one example of the matching of the breaks. Reference numeral 70 denotes the break based on the estimation of the self-position and the map, which is the break obtained by projecting the break on the map onto the wide-angle camera image, based on the self-position estimated from the landmarks. Reference numeral 72 denotes the break in the camera image, in which a portion of the break is hidden by another object, or is lost due to lighting or the like. The break obtained by projecting the break on the map based on the self-position found by dead reckoning is shown as a break 74 from the dead reckoning. The resultant, for example, from integrating distances of respective arrows in FIG. 7 is a matching error of the breaks.

The error between the breaks 70,74 is an estimation error of the self-position, and reliability of position recognition by dead reckoning is low, resulting in a vague error. Both of the breaks 70, 74 are the resultant from projecting based on the map, and even in an area where the break 70 and the break 72 do not correspond to each other, the break 74 corresponding to the break 70 exists. Consequently, in an area where the breaks 70, 72 correspond to each other, the distances of arrows in FIG. 7 are added to evaluate the error, and in the area where the breaks 70, 72 do not correspond to each other, the errors between the breaks 70, 74 are added for evaluation.

For the evaluation of the matching error, the errors may be simply integrated, or may be turned into statistics for evaluation. Moreover, in order to prevent an area where the error is extremely large from affecting the matching result, a function attenuating when the error becomes large may be set, and the errors may be multiplied by the function and then, added. An upper limit may be provided for the error. Furthermore, the error between the breaks 70, 74 may be used by multiplying the same by a weight smaller than 1.

The following effects can be obtained in the example.

(1) Even when a portion of a landmark is hidden and not seen, or a false mark confusing the landmark occurs, influence thereof is small.

(2) A landmark in the vertical direction is one point in an XY plane, while a break is a curve or a line segment in the XY plane, including a more information amount. The use of the break between a floor and a wall allows it to be easily evaluated whether or not correspondence of the landmarks between the wide-angle camera image and the map is correct.

(3) When a portion of the break is lost in the wide-angle camera image, a break projected based on the dead reckoning can compensate it.

The invention claimed is:

1. An estimation device for estimating a position of a mobile unit, comprising:
    a wide-angle camera configured to generate a wide-angle camera image;
    a storage configured to store a map of a landmark including a break formed at an intersection between a floor and an object on the floor, said object is perpendicular to the floor;
    a landmark matching unit configured to match a landmark found from the wide-angle camera image against the landmark on the map to estimate a self-position of the mobile unit;
    a break projecting unit configured to obtain at least a first projected break projected onto the wide-angle camera image based on the break stored in the storage and on the self-position of the mobile unit estimated by the landmark matching unit; and a break matching unit configured to match at least the first projected break and a break in the wide-angle camera image, wherein when the break in the wide-angle camera image corresponding to said first projected break is absent, said break matching unit configured to evaluate an error between said first projected break and a second projected break projected by said break projecting unit on to the wide-angle camera image based on the break stored in the storage and another estimated self-position of the mobile unit estimated by an internal sensor of the mobile unit.

2. An estimation method for estimating a position of a mobile unit, comprising:

generating a wide-angle camera image;

storing a map of a landmark including a break formed at an intersection between a floor and an object on the floor, said object is perpendicular to the floor;

matching, using a position estimating unit, a landmark found from the wide-angle camera image against the landmark on the map to estimate a self-position of the mobile unit;

obtaining at least a first projected break projected based on the stored break and on the self-position of the mobile unit estimated by the matching onto the wide-angle camera image; and matching, using the position estimating unit, at least the first projected break and a break in the wide-angle camera image, wherein when the break in the wide-angle camera image corresponding to said first projected break is absent, evaluating an error between said first projected break and a second projected break projected on to the wide-angle camera image based on the stored break and another estimated self-position of the mobile unit estimated by an internal sensor of the mobile unit.

3. A mobile robot with a storage medium having stored thereon an estimation program for estimating a position of the mobile robot, the estimation program causing said mobile robot to execute the following steps:

generating a wide-angle camera image;

storing a map of a landmark including a break formed at an intersection between a floor and an object on the floor, said object is perpendicular to the floor;

matching a landmark found from the wide-angle camera image against the landmark on the map to estimate a self-position of the mobile robot;

obtaining at least a first projected break projected based on the stored break and on the self-position of the mobile robot estimated by the matching onto the wide-angle camera image; and matching at least the first projected break and a break in the wide-angle camera image, wherein when the break in the wide-angle camera image corresponding to said first projected break is absent, evaluating an error between said first projected break and a second projected break projected on to the wide-angle camera image based on the stored break and another estimated self-position of the mobile unit estimated by an internal sensor of the mobile unit.

* * * * *